Aug. 2, 1938.   H. BROWN   2,125,282

FORCE MEASURING DEVICE

Filed July 18, 1936

Inventor
HART BROWN.

By Jesse R. Stone
Lester B. Clark
Attorneys.

Patented Aug. 2, 1938

2,125,282

UNITED STATES PATENT OFFICE 2,125,282

FORCE MEASURING DEVICE

Hart Brown, Houston, Tex., assignor to Brown Gravity-Meter Corporation, Houston, Tex., a corporation of Texas Application July 18, 1936, Serial No. 91,387

8 Claims. (Cl. 265—1.4)

The invention relates to devices of the type used to measure increments of force and may be particularly applied to the measurement of very small increments of force.

It is one of the objects of the invention to provide a means to measure force regardless of whether the force involved is electro-magnetic, electro-static, gravimetric or is in some other physical form or combination of forms.

Another object of the invention is to measure with extreme accuracy very small forces with a view of determining slight variations in the force being measured.

Another object of the invention is to measure the force of gravity with sufficient precision that the resulting measurements will be of value to geologists and physicists or others who may have cause to deal with the gravimetric forces.

Still another object of the invention is to devise a force measuring device wherein the force being measured is placed in balance with a combination of torsional and axial stresses so that variation of the force being measured will cause an unbalancing of the forces in such a manner that the result of the unbalancing can be measured as an indication of the variation in the force being measured.

Another object of the invention is to apply a bifilar suspension for a weight in such a manner that the suspending members for the weight carry both the tension and the torque.

Still another object of the invention is to measure the force of gravity by the unbalancing of a bifilarly supported member.

Other and further objects of the invention will be readily apparent when the following description is considered in connection with the accompanying drawing wherein.

In order to provide a mechanism wherein very small increments of force may be accurately measured due to a balancing action it is desirable of course to obtain one force which is to be used as an arbitrary zero which can be maintained constantly, and it is one of the objects of this invention to provide a weight member which is suspended in such a manner that it will balance the mechanism at such arbitrary zero position quickly and accurately in order to measure any variation in the force affecting the balancing thereof.

In the past, bifilar suspension of the force measuring element has been attempted, but it is my understanding that all such devices have embodied so many strands and parts that it has been impossible for practical purposes to obtain an operable device which could measure satisfactorily small increments of force such as the variations in gravimetric forces.

Figure 1:
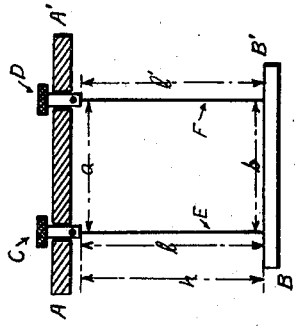
Fig. 1 is a side elevation of one form of arrangement of the device where the parts are symmetrical and before the forces are applied.

With a view of providing a device which can measure small forces a suspending member A—A' has been diagrammatically illustrated in Fig. 1. This member will be stationary and carry the adjusting knobs C and D which may be spaced apart any desired distance —$a$—. These knobs C and D are arranged for rotation in the support member A—A' and have attached thereto the strands E and F, respectively.

The strands E and F are of lengths $l$ and $l'$, respectively, and are attached to the weight or bar member B—B' the points of attachment being spaced apart on the bar B—B' by a distance —$b$—. The length generally between the point of support of the strands E and F in the knobs C and D and the bar B—B' may be a length $h$.

The distance —$b$— may vary so that the strands E and F are attached to the ends or in any other desired position on the bar B—B' except that they cannot be attached to the very center thereof.

Likewise the distance —$a$— may be varied so that the strands E and F may be spaced any desired amount along the member A—A' just so both strands are not attached exactly at the same point.

To those skilled in the art it will be readily apparent that the present mechanism will have various adaptations, depending upon the mechanism used and the purpose to which it is to be applied. To accommodate various circumstances, it seems obvious that the selection of the materials used as well as the dimensions, shapes and the constitution of the various parts can be varied.

Figure 2:
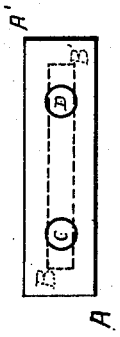
Fig. 2 is a top plan view of Fig. 1.

By having reference to Fig. 1 it seems obvious that if there is no torsion applied to either of the strands E and F that the bar B—B' will hang in a horizontal position if the strands E and F are of the same length, and that it will be held in a position parallel with the support A—A' and will assume the position shown in Figs. 1 and 2.

Figure 4:
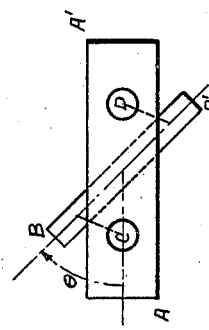
Fig. 4 is a top plan view of Figure 3.

In event torsion is applied to the strands E and F by rotating the knobs C and D, if rotated in a clockwise direction as seen in Fig. 4, the bar B—B' will swing due to this torsion through an angle which has been indicated as θ, which will vary of course, depending upon the amount of turning impressed upon the knobs C and D, and, of course, the resulting torque thereby applied to the strands E and F.

Figure 3:
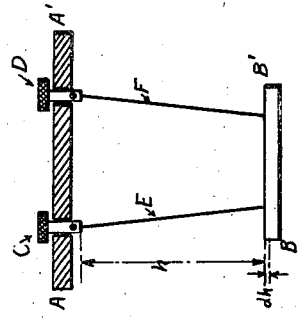
Fig. 3 is a view showing the device with the forces applied and in balanced position where both torque and tension are carried by the suspending strands.

The axis of the bar B—B' will assume a position such as that shown in Figs. 3 and 4 if equal torsional strains are placed upon each of the suspending strands E and F because each will tend to rotate its portion of the bar.

As seen in Fig. 3, upon rotation the bar B—B' will be raised slightly because of course the strands E and F remain at a constant length and as the bar swings, the lower end of the strands E and F will follow an arc so that the bar will be raised a slight increment, which is shown in Fig. 3 as $dh$.

Obviously the amount of swinging indicated by the angle θ will of course depend upon the force which must be overcome in raising the bar B—B' through the increment $dh$ so that the torsion on the suspending strands E and F opposes the pull tending to restore the bar B—B' to its lowermost position. Thus, when the bar B—B' assumes a position such as seen in Fig. 4 there is then a balance between the torque developed by twisting the strands E and F, and the exactly equal but oppositely directed torque developed by the force of gravity attempting to return both strands, and of course the bar B—B', to their lowest positions. If the torsion developed by twisting the strands can be maintained essentially constant, then of course the relative position of the bar during different applications of force will indicate the variation of one force relative to the other.

Many methods of measuring small changes in the angle θ are of course known to those skilled in the art of physics and any of these recognized methods may be employed.

Probably the most practical methods employ the deviation of a beam of light as an indication of the deviation of the bar. Various arrangements of these optical methods for making these observations may be employed.

Figure 5:
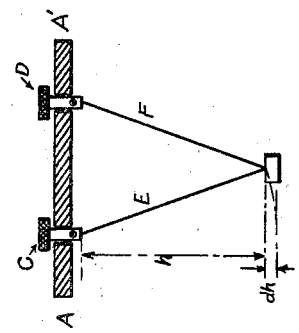
Fig. 5 is a side elevation of the device in which position the balance is on the brink of becoming unstable.
Figure 6:
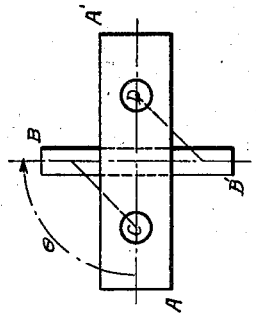
Fig. 6 is a top plan view looking on Fig. 5.

In Fig. 5 the bar B—B' is rotated through the angle θ so that the angle θ approximates 90 degrees. In other words, the angle θ has varied from zero to approximately 90 degrees, as seen in Fig. 6.

In this position and with equal values for $a$ and $b$ and for $l$ and $l'$ the mechanism is on the brink of becoming unstable, and if the bar is rotated sufficiently beyond the position of θ equals 90 degrees a position of unstable equilibrium will be reached. For purposes of illustration, the unstable position will be designated as that position where the angle θ equals T degrees. The actual value of T depends essentially upon the values of the dimensions such as $a$, $b$, $l$ and $l'$ and torsion constants of the suspending members, while under certain other conditions it may vary in accordance with the torque developed by turning the knobs C and D.

The physical significance of this point of unstable equilibrium is simply this: that by making a suitable adjustment of the downward force acting on the bar B—B' and by suitable adjustment of the amount of torsion on torsion strands E and F that the bar B—B' may be balanced so that it will rest in any position such that θ equals zero degrees to any other desired position up to that position where θ equals T degrees. Of course if θ is increased beyond where θ equals T degrees the mechanism will of its own accord continue to increase the value of the angle θ such that the strands E and F will tend to wind together until equilibrium is again established, so that it is desirable to operate the device in the stable region where θ lies between zero degrees and T degrees.

In the particular case where —$a$— equals —$b$—, $l$ equals $l'$, the torsion constants of the two suspending members are equal, and the number of twists given each suspending strand is equal, then the point of unstable balance (T degrees) will lie between θ equals 90 degrees and θ equals 180 degrees, and will be definitely determined by the torsion constants of the strands. The smaller the torsion constants of the strands used, the closer the point will be to 90 degrees. Putting —$a$— unequal to —$b$—, other conditions remaining unchanged, advances the unstable balance point to values always greater than 90 degrees, and again the exact value of T will be determined by the torsion constant employed. Thus, in general, the value of T will lie between θ equals 90 degrees and θ equals 180 degrees, unsymmetrical arrangements however of this mechanism, caused by variations in dimensions and materials of the component parts, may result in values for T which lie outside of the above limits.

By referring to Figs. 4 and 6 it will also be apparent that if the knobs C and D are rotated counter clockwise; that is, in directions opposite to those shown in Figs. 4 and 6, that the bar B—B' will move to a position such that θ would have increased in a negative direction until another position of unstable equilibrium would have been established with the bar in a position where θ equals —T degrees.

The present invention concerns itself particularly with the mechanism which is operating where the bar positions are such that θ has values lying between zero and T or zero and —T.

In the above description of the essential functioning of the balance mechanism, the only forces which are actually balancing the torsion applied to the members E and F are resultants of the weight of the suspended mass; i. e., chiefly the bar B—B' which is of course a gravimetric force. Other forces may be applied so as to reduce or to supplement this gravimetric force, and it is the purpose of this balance to be used to measure such variations in these supplementary forces. Obviously the magnitude of the total force to be balanced by the torsional force governs the selection of materials as well as the shapes of the parts and the selections of the dimensions —$a$—, —$b$—, $l$ and $l'$, all of which will enter into the construction of the particular instrument which is to be built for any particular force measuring problem. In turn, these factors will be determined by the magnitude of the incremental force which is to be accurately measured as well as the degree of accuracy which is required in making such measurement, along with the effect which the nature of the force being measured may have upon the instrument, so that these selections depend on whether such force is gravimetric, electro-magnetic or otherwise must be governed in conjunction with the conditions under which the instrument is to be used while the measurements are being taken.

Some of the variations, dimensions and proportions which may be arranged in accordance with the circumstances under which the instrument is to be used include the arrangement whereby the strands E and F may be attached to the extreme ends of the suspended bar member B—B' or whereby they will be attached at points nearer to the center of such member. The dimensions —a— and —b— may be made either equal or unequal, and it has been found that advantages sometimes accrue from making them unequal. As to the lengths l and l' of the strands E and F, respectively, they may be made equal, but under some conditions it is to an advantage to make them definitely unequal. Likewise, such members E and F may be made of either the same or different material and under some conditions it is to an advantage to make them different physically.

It is to be distinctly understood, however, that the device will function, regardless of whether the dimensions —a— and —b— are made equal or unequal or whether the distances l and l' are made equal or unequal and also whether the torsion members E and F are constructed as circular wires, fibres, ribbons, or other cross-sectional shape, and they may be either coiled or helical or in the form of a rippled spring or such other modification thereof which have been designated generally as strands which may be capable of transmitting torsion to and sustain the weight and/or other forces acting on the bar member. The two suspending members, or strands E and F, may be of the same or different material or the same or different shape, and may be fabricated in any manner described.

In event the mechanism is to be used as a gravity measuring device it is usually desirable, to provide all of the sensitivity and accuracy that it is possible to obtain in a portable instrument, and since if the mechanism will function as a suitable gravity measuring device it may be simplified in general where the invention is applied to force measuring instruments requiring less sensitivity and accuracy or where portability is not requisite. For the foregoing reason repeated reference has been made to the application of this mechanism as a gravity measuring instrument.

In an arrangement of the apparatus in which the dimensions —a— and —b— are made small as compared with the dimensions l and l' and in which the suspending strands E and F have physical characteristics such that each may be twisted through a number of complete rotations in order to balance the bar B—B' in a position such that the angle θ shall be only slightly less than θ equals T degrees the assembly has been found to provide an apparatus in which the sensitivity required to make gravimetric measurements may be obtained.

When such an apparatus is balanced at a point such that θ closely approaches T degrees it will then function so that very slight changes in the downward force on the bar B—B' will result in an appreciable change in the angle θ so that an accurate means of measuring a very slight change in the angle θ provides a means for detecting and measuring a very slight change in the gravimetric force at two or more different locations where such force may be measured.

Broadly the invention contemplates a means of measuring very small increments of force and obtaining a more or less stable instrument as compared to those now in general use by obtaining a device wherein both the tension and the torque are carried by the same members so as to maintain them in a stable position. While suspension of the weight to apply tension to the strands has been described it seems obvious that other forms of stress application may be utilized such as compression of the members by supporting the weight from below or otherwise.

Various changes may be made within the scope of the appended claims, in which it is desired to claim all novelty inherent in the invention.

I claim:

1. A force measuring device of the character described comprising a support, a pair of spaced members rotatably arranged thereon, a suspension strand carried axially on each of said members, and a bar member connected to said strands and solely supported thereby, said strands being twisted whereby said bar is rotated to a position of equilibrium by the torque in the strands.

2. A force measuring device of the character described comprising a support, a pair of spaced members rotatably arranged thereon, a suspension-torsion strand carried by each of said rotatable members, and a bar-member connected to said strands and supported solely thereby, whereby said bar is rotated a definite amount, which is a measure of the forces acting upon said bar.

3. A force measuring device of the character described comprising a support, a spaced pair of suspension torsion strands attached thereto, a bar-member connected to said strands and supported solely thereby, means for rotating said strands to develop therein torsional stresses resulting in rotation of said bar a definite amount which is a measure of the forces acting upon said bar.

4. A force measuring device of the character described comprising a support, a spaced pair of spaced suspension-torsion strands attached thereto, a member to which the other end of the strands from the support are attached in spaced relation, said strands serving as the sole support of said member, and means for rotating the strands to develop therein torsional stresses resulting in rotation of said member a definite amount which is a measure of spacing the forces acting upon said spacing member.

5. A force measuring device comprising a bifilar suspension, a weight directly connected thereto and rotated through a definite angle by virtue of torsion in said suspension, whereby a balance is established between the torque in the suspension members and forces tending to resist movement of said weight, said weight being solely supported by said suspension.

6. A force measuring device of the character described comprising a support, a pair of spaced members rotatably arranged thereon, a suspension strand carried axially on each of said members, and a bar member supported solely by said strands, one of said strands being twisted whereby said bar is rotated to a position of equilibrium by the torque in said strand.

7. A force measuring device of the character described comprising a support, a single pair of spaced suspension-torsion strands attached thereto, a bar member connected to said strands only, and means for rotating said strands to develop therein torsional stresses which rotate said bar a definite amount which is a measure of the forces acting upon the bar.

8. A force measuring device of the character described comprising a weight member, a fixed member, a pair of spaced strands directly connected to said weight member, and independent means carried by said fixed member and connected to the opposite ends of said strands and adjusted to apply a torque to each strand to thereby bias said weight member whereby the position assumed by the weight against the effect of said bias may be used as an indication of the gravimetric force exerted upon said weight member.

HART BROWN.